O. OPSJON.
REVOLUBLE EGG CRATE.
APPLICATION FILED SEPT. 16, 1913.
1,134,481.
Patented Apr. 6, 1915.
3 SHEETS—SHEET 1.
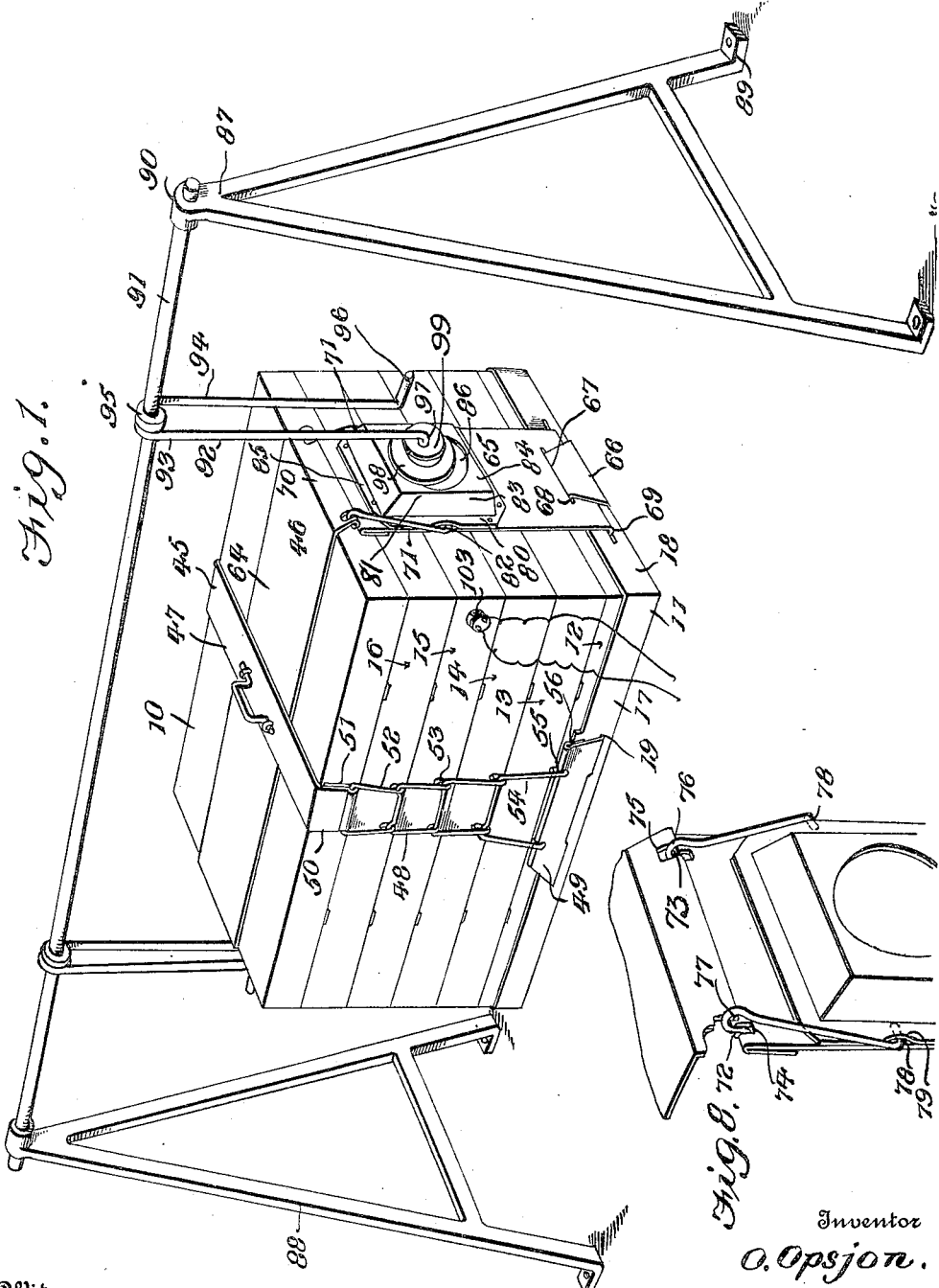

O. OPSJON.
REVOLUBLE EGG CRATE.
APPLICATION FILED SEPT. 16, 1913.
1,134,481.
Patented Apr. 6, 1915.
3 SHEETS—SHEET 2.
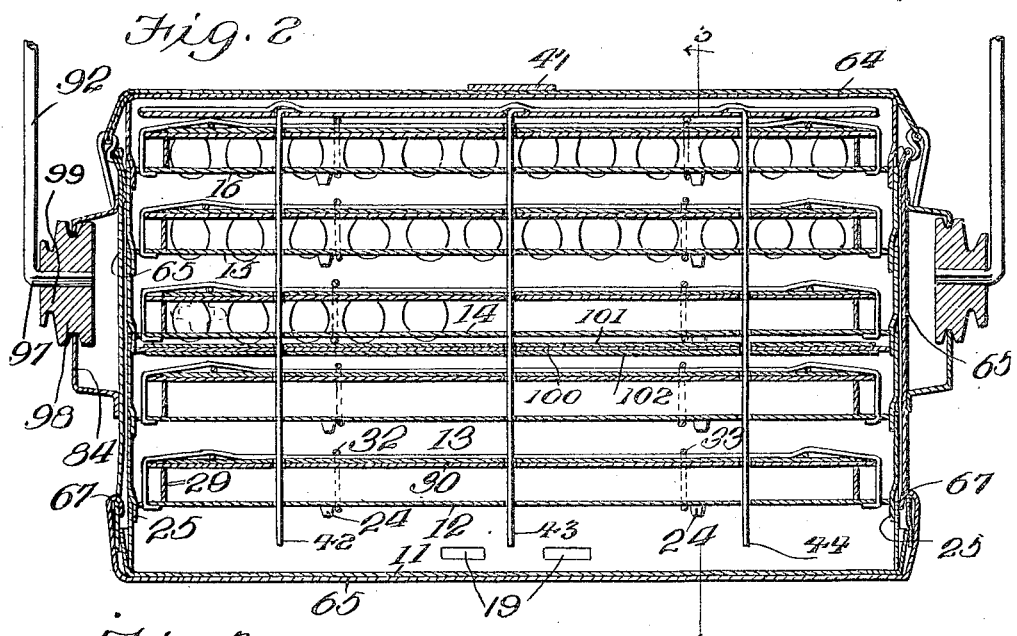
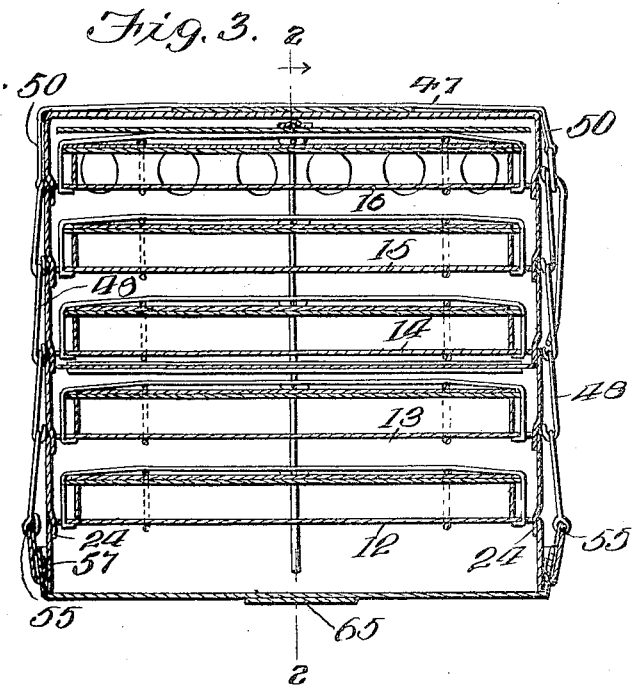
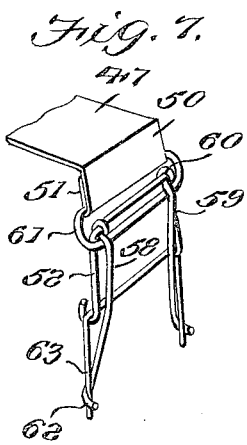
Inventor
O. Opsjon.

O. OPSJON.
REVOLUBLE EGG CRATE.
APPLICATION FILED SEPT. 16, 1913.
1,134,481. Patented Apr. 6, 1915.
3 SHEETS—SHEET 3.
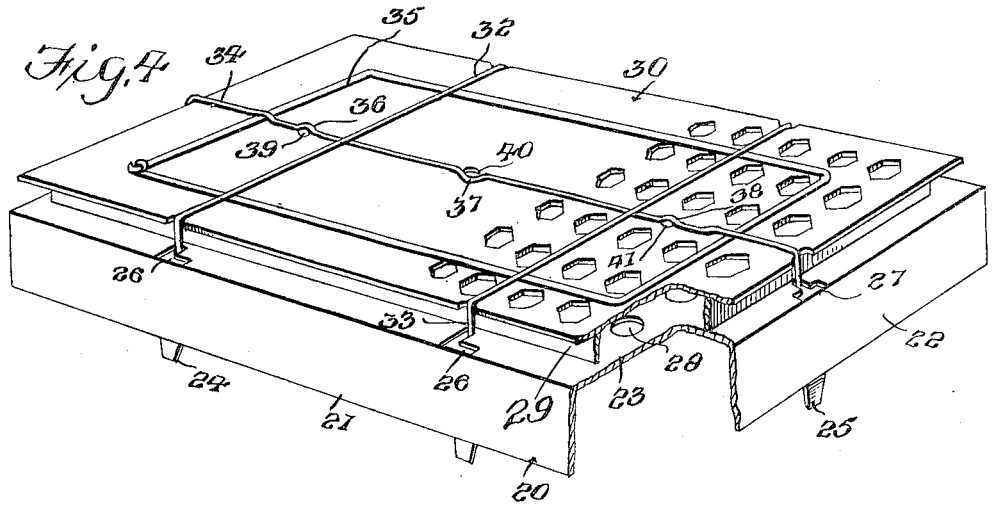
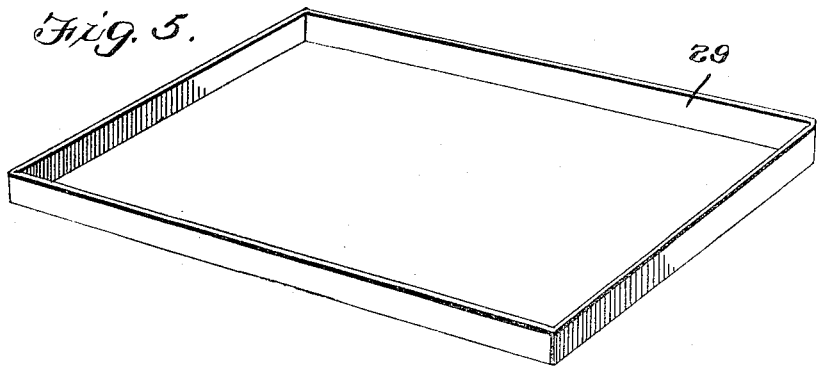
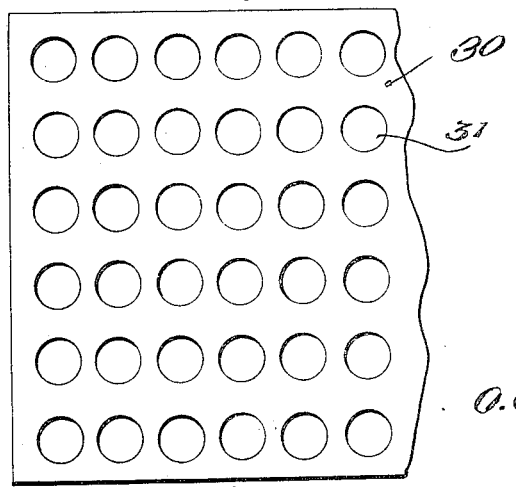
Inventor
O. Opsjon.

UNITED STATES PATENT OFFICE.

OLUF OPSJON, OF SALTESE, MONTANA.

REVOLUBLE EGG-CRATE.

1,134,481.  Specification of Letters Patent.  Patented Apr. 6, 1915.

Application filed September 16, 1913. Serial No. 790,060.

*To all whom it may concern:*

Be it known that I, OLUF OPSJON, citizen of the United States, residing at Saltese, in the county of Missoula and State of Montana, have invented certain new and useful Improvements in Revoluble Egg-Crates, of which the following is a specification.

This invention relates to new and useful improvements in storing and shipping crates, and has particular reference to that type of such devices which are employed in storing and shipping eggs.

As one of its principal objects, the present invention aims to provide an egg crate constructed in such manner that it may be revolubly mounted within a supporting frame so that at desired predetermined intervals the crate may be turned or revolved to dispose the eggs in various positions. The desire to provide an egg crate of the type above set forth obtained in the mind of the applicant after a careful investigation and a series of experiments, in which it was found that the tendency of the eggs toward decomposition was withstood for a longer period when the eggs were turned to assume changed positions at predetermined intervals than when allowed to remain in one position for a considerable length of time.

A further object of this invention contemplates the provision of an egg crate formed of a number of separate and independent sections, each adapted to receive a number of eggs, and each equipped with retaining devices arranged to coact with the similar elements of the other sections for securing a number of the crate sections in unitary assembled relation. By constructing the crate of a number of separate and detachable trays or sections, the packing, dispensing, and general handling of the article is, of course, greatly facilitated and expedited, inasmuch as the trays may be separately packed or removed and, therefore, handled with greater ease than were the elements of the crate designed to maintain a constant assembled position.

An object of equal importance with the foregoing is to provide a novel supporting rack in which the egg crate may be revolubly suspended in such manner that the operation of turning the case at the desired intervals will be a matter requiring little or no effort and time.

An object coexistent with the foregoing is the provision of a novel form of binding belt capable of performing the twofold function of retaining the various sections of the crate in assembled relation and affording efficient means for attaching the crate to the supporting frame referred to above.

A still further object resides in the provision of an electric heating attachment carried by one of the sections or trays of the crate so that when the eggs are in transit and are subjected to undue cold, they may be readily and conveniently warmed to prevent freezing and consequent decomposition.

The above and additional objects are accomplished by such means as are illustrated in the accompanying drawings, described in the following specification and then more particularly pointed out in the claims which are appended hereto and form a part of this application.

With reference to the drawings, wherein I have illustrated the preferred embodiment of my invention as it is reduced to practice, and throughout the several views of which similar reference numerals designate corresponding parts, Figure 1 is a perspective view illustrating the crate in supported position within the supporting rack; Fig. 2 is a longitudinal section taken through the crate; Fig. 3 is a section on the line 3—3 of Fig. 2; Fig. 4 is a detail perspective view of one of the trays in disassembled relation; Fig. 5 is a detail view of the metallic rim employed in connection with each tray; Fig. 6 is a detail plan view of the retaining plate employed in holding the eggs against displacement from the trays. The egg receiving openings of the plate as shown in this figure are circular in shape, differing from the egg receiving openings shown in Fig. 4, wherein they are hexagonal; Fig. 7 is a detail view of the locking device used in connection with one of the retaining bands; and Fig. 8 is a detail view of the bearing cup employed in revolubly mounting the crate within the supporting rack or frame.

Before proceeding to the description of the drawings, it is desirable for the sake of clearness to classify the subject-matter of this invention with respect to the composite parts which, when in assembled relation, form the complete operative structure. Briefly, the major elements may be defined as follows: 1. The egg crate proper; 2. The retaining devices by which the various sections of the crate are bound or held in assembled relation; and 3. The supporting rack or frame employed in revolubly mounting the crate. Taking up these elements in the order named, the egg crate proper includes in the preferred embodiment, top and bottom casings or boxings, designated respectively by the numerals 10 and 11, and five substantially similar tray sections, designated as entireties in Fig. 1 by the numerals 12, 13, 14, 15 and 16. Explanatory of the statement that these egg trays are five in number in the preferred embodiment, it may be set forth that in practice it has been found that the space occupied by five trays is such that when they are in assembled relation they form a crate which may be handled with expedition. In this connection, it will be obvious, however, that the number of tray sections which are included in each crate is a purely arbitrary matter which must be governed by the conditions concurrent with the adoption of the device.

The top and bottom casings 10 and 11 are substantially similar in construction and consist primarily in approximately rectangular metallic bodies, as will be readily observed upon reference to Fig. 1 in which they are best illustrated. The side and end walls 17 and 18 of the tray 11 are each formed with longitudinally extending slots, indicated at 19. Two of these slots are formed in each end of the side walls and are arranged at points equidistant from the center of the respective walls. Further disclosures relative to the purpose for which these slots are intended will be hereinafter presented in that portion of the specification devoted to the description of the binding or retaining devices which hold the several trays in assembled relation.

The five egg receiving trays heretofore designated as entireties by the numerals 12, 13, 14, 15 and 16 are practically identical in construction and arrangement of parts, and it will, therefore, be necessary to describe only one of them in detail.

Reference will now be had particularly to Fig. 4, in which one of the trays is illustrated in disassembled relation. Upon reference to this figure, it will be observed that the main body portion of each tray consists of a metallic casing 20 which, when in use, is arranged with its side walls and end walls, designated respectively by the numerals 21 and 22, in dependent relation to the top plate 23. The two side walls of the tray body are equipped with longitudinally spaced downwardly extending toes or lugs 24, while the end walls 21 are each provided with similar devices 25. In assembling the trays, these toes are projected through the slots formed in the top plate 23 of the adjacent lower tray and operate to prevent lateral or longitudinal shifting of the sections. A pair of these slots is formed adjacent each longitudinal edge of the top plate 23, and as indicated at 26 in Fig. 4 each slot is approximately L-shaped with the lateral portion of the L extending longitudinally of the plate. Approximately centrally of the transverse end edges of the top plate are formed substantially T-shaped slots as indicated at 27. It will be observed upon reference to Fig. 4 that the slots 26 and 27 are in each instance in vertical alinement with the adjacent toes 24 and 25, the obvious purpose of such disposition being to bring the various toes and slots of the several sections in registering position when the trays are arranged in assembled relation.

As indicated at 28, the plate 23 is provided with a plurality of transversely and longitudinally spaced orifices which receive the eggs and hold them in the desired spaced relation to each other. As a means for preventing the displacement of the eggs from their openings or seats 28, there has been provided a spacer frame or rim 29 and a retaining plate 30. The rim 29 is a substantially rectangular metallic frame which is removably applicable to the top plate 23, and which, when in assembled position, completely incloses the egg. As well as forming a rim or encircling wall, this member 29 acts to space the retaining plate 30 a proper distance from the plate 23. Relative to the construction of the member 30, it will be observed, particularly upon reference to Fig. 6, that this plate is formed with a plurality of circular orifices or openings 31, which register with the various openings 28 of the top plate 23 and receive the upper ends of the eggs.

While it has been preferable in practice to make the egg receiving openings hexagonal in shape, as in Fig. 4, it is, of course, obvious that they may be made circular in the manner shown in detail in Fig. 6. It will, therefore, be apparent that by binding the member 30 firmly on the rim 29, the eggs are held against transverse, longitudinal, and vertical displacement. In retaining this member 30 in the desired position on the rim 29, the present invention preferably employs a pair of transversely extending wires 32 and 33, and a longitudinally extending tie wire or stay 34. These wires may be of any desired gage and are bent to produce a U-shaped conformation, being further formed with terminal hooks which are passed through the slots 26 and 27, and engage the under face of the bottom wall 23 adjacent the terminal of the slots. In order to prevent the wires or stays 32, 33 and 34 from biting into the plate 30 and unduly distorting it, there has been provided a wire frame 35, which is substantially rectangular, and is of less length and breadth than the member 30. This frame is interposed between the plate 30 and the tie wires and, as will be observed upon reference to Fig. 4, forms a support for each of the tie wires at two points in the length thereof. It may be well to mention the fact that while the plate 30 is preferably formed of heavy pasteboard or some other coarse, cheap material, this invention also comprehends the employment of any desired form of fabric or composition which may be found efficient.

The wire 34 is bent at three points, as at 36, 37 and 38 to follow the edges of three vertical openings 39, 40 and 41 formed in each tray section for the purpose of receiving rods 42, 43 and 44 which, as will be observed upon reference to Fig. 2, form a further means for preventing the longitudinal and transverse shifting of the trays when these latter are in assembled relation. A shield may be provided for the upper terminals of the rods 42, 43 and 44, as illustrated in Fig. 2. This shield preferably consists in an elongated metal strip formed with a number of indentations which receive the terminals of the rods. The actual construction and arrangement of the several parts of the egg trays and bottom and top casings which, when in assembled relation, form the crate proper of this invention being thus disclosed, the description of the retaining devices employed in holding these elements in assembled relation is, therefore taken up as next in order. These retaining devices are in the nature of flexible metallic bands and are two in number, being designated as entireties in Fig. 1 by the numerals 45 and 46, the member 45 being disposed to extend transversely of the sections and the member 46 being arranged longitudinally thereof. The retaining band or strap 45 includes a top strap 47 and link chains 48 which connect the top band with the securing plates 49. The member 47 is formed of a length of any suitable metal, such as galvanized tin, and is bent at each terminal to produce downwardly extending attaching wings 50 which are bent upon themselves as at 51 and pivotally receive the upper link 52 of the member 48. The member 48 is formed in the preferred embodiment of a number of substantially U-shaped wire elements which are terminally bent to produce hooks, as at 53, the hooks of each separate link or bail being adapted to engage the bight portion of the next adjacent link. The hooks of the lowermost link 54 are inserted through spaced apertures formed in the upper edge of the member 49 and engage a hinge rod 55 which extends longitudinally of the upper edge of the member 49 and is held in fixed position by the turned edge 56.

The securing plates 49 which are two in number, are applied to the side walls of the bottom casing 11 and are similar in construction, it being necessary, therefore, to describe only one of them in detail. Each plate 49 consists essentially in an elongated strip of metal, the lower edge of which is equipped with integrally formed hooks 57 which are terminally disposed and are inserted through the slots 19 when the plate is applied during the operation of securing the assembled tray. The manner in which the plates 49 are applied will be readily comprehended upon reference to Fig. 3, in which figure the disclosures are most distinct as regards this element.

As a means for securing the free terminal of the member 47 to the free terminal of the adjacent link chain 48, this invention employs a pair of latch wires, illustrated in detail in Fig. 7, and designated by the numerals 58 and 59. These wires are approximately S-shaped in conformation, their upper terminals being provided with eyelets, as at 60, in order that the wires may be secured to the bight portion of the uppermost link 52. A U-shaped wire keeper 61 is secured to the free terminal of the member 47 by the insertion of its inwardly directed terminals between the portion 50 and the retaining rib 51 which, as previously described, is produced by bending the portion 50 upon itself. In securing the chain 48 to the member 47, the latch wires 58 are inserted through the keeper 61, are then pulled down to permit their hook terminals 62 to be inserted and passed around the arms of the next adjacent link, as at 63.

Passing now to the description of the longitudinally disposed retaining band, heretofore designated as an entirety by the numeral 46, it will be observed upon reference to Fig. 1 particularly, that this device includes a metallic strap 64 which is similar in construction to the member 47 and is similarly arranged to engage the top plate of the member 10. It will also be observed that the link chain 48 of the member 45 is replaced by a plate 65 which is approximately equal in length to the combined vertical dimensions of the five egg trays, and is detachably connected to the member 64 and to a somewhat similar metallic strap 66 which is disposed longitudinally of the member 11 and is terminally bent to produce upwardly extending hooks as at 67. These hooks are inserted through transverse slots 68 formed in the lower terminals of the plates 65. The hook devices 69 are also formed at the lower terminals of the members 65 and are inserted through the slots 19 formed in the walls of the member 11, as previously set forth.

In detachably connecting the plates 65 to the terminal wings 70 of the strap 46, this invention employs pairs of latch wires 71 which are greatly similar to the latch wires 59 of the link chain 48. Referring now particularly to Fig. 8, in which these latch wires and their associated parts are illustrated in detail, it will be observed that eyelets 72 are employed in pivoting the wires to a rod 73 carried by the upper terminal of the plate 65, and that these eyelets operate in slots as at 74. In applying these latch wires, the operation consists essentially in inserting them through transversely spaced slots 75 formed in the wings 70 to bring their bent portions 76 in engagement with a rod 77 carried at the lower edge of the members 70 and subsequently inserting their inwardly directed terminal hooks 78 in the cups 79 which are produced by stamping the side flanges 80 of a bearing cup 81 outwardly to provide a recess as indicated at 82. If so desired, the transverse band 45 may be equipped with a hand grip as illustrated in Fig. 1.

The bearing cup 81 consists of a metallic shell formed with outwardly diverging side walls 83, a face plate 84, and side flanges 80 and 85. The side flanges 80 and 85 are secured by rivets or other suitable fastening devices to the plate 65 and are arranged so that a circular opening 86 formed in the face plate 84 will be disposed approximately centrally of the end face of the crate when the sections are in assembled relation. These bearing cups 81 are in practice employed in rotatably mounting the crate in the supporting frame to be next described. This supporting frame includes a pair of supporting legs or standards 87 and 88, the lower terminals of which are formed with laterally extending toes 89 for an obvious purpose, while the upper terminals of the legs are equipped with integrally formed bearings 90 which receive a supporting rod or beam 91. This member 91 is slidable in the bearings 90 and is equipped with removable bracket arms designated as entireties by the numeral 92. Each bracket arm comprises a metallic rod or wire bent upon itself approximately midway its length to produce a pair of parallel arms 93 and 94 which comprehend at their juncture a plurality of coils 95 which form an eyelet for the application of the bracket with the rod. In practice the brackets 92 are arranged with their arms dependent from the rod 91 and are terminally equipped with lateral fingers or extensions 96 and 97 which serve as stub shafts or axles for rollers 98. These rollers are inserted through the openings 86 of the face plate 84, and as will be apparent, support the crate while, at the same time, permitting the crate to be rotated about a horizontal axis. By this means, the principal object of this invention is accomplished inasmuch as the crate may be readily turned to dispose the eggs in various positions at predetermined intervals, resultantly deferring the decomposition of the eggs, as previously set forth.

The arm 93 of each bracket is preferably longer than the arm 94, the purpose of this construction being to permit the supporting of two or more crates at the same level in a single supporting frame. In this connection, it will be observed that the roller 98 is formed with a reduced concentric hub 99 which is grooved, as is the major portion of the roller. When two or more crates are to be supported within the same frame, a roller 98 is placed on the stub axle 96 of the bracket and is disposed with the major portion of the roller innermost, so that the bearing cup of the next adjacent plate will rest in the groove of the reduced hub 99. It will, therefore, be apparent that while the level of the stub axle 96 is above that of the stub axle 97, the reduced diameter of the hub 99 as compared to the major portion of the roller will act to support the crates at the same level. This construction is particularly desirable, inasmuch as the present invention is intended to be employed in revolubly supporting egg crates in freight cars or warehouses, so that while in transit or in storage, the operation of placing the eggs in various positions may be easily accomplished. It may be mentioned in this connection that a further desirable result is accomplished by supporting the egg crate in spaced relation to the ground or floor while the eggs are in transit or in storage by reason of the fact that the resiliency of the rod 91 which is formed of wood or metal will tend to absorb shocks and prevent the breakage of the eggs.

It has been found highly desirable to equip the egg crate with some artificial heating means which will prevent the freezing of the eggs should they be subjected to a freezing temperature while in transit or in storage. Preferably this invention employs an electric heating device, the most desirable form of which has been found to be that illustrated particularly in Figs. 2 and 3. A resistance plate 100 is arranged in one of the trays and is faced with asbestos pads 101 and 102. These pads may, of course, be of any fabric or composition found desirable and efficient, the only requirement being that the material used to insulate the resistance plate be of such nature as to evenly distribute the heat and prevent undue intensity in the tray in which the resistance plate is arranged. A contact socket is, of course, provided as at 103 for connecting the resistance plate to an electric current.

In conclusion, it may be observed in regard to the operation of the device that inasmuch as the egg crate is supported at approximately central points of each end, it will remain in any adjusted position of rotation, particularly inasmuch as the frictional resistance between the edge of the opening 86 and the roller 98 will overcome any slight variation in the center of gravity of the crate which may occur when eggs of varying sizes are packed in the trays.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

What I claim is:—

1. A revoluble egg crate including a plurality of separate sections adapted to be assembled into a unitary structure, a flexible band for holding said sections in assembled relation, bearing cups carried by said band, a supporting frame for revolubly mounting said crate, and grooved disks carried by said supporting frame and adapted to be inserted in the said bearing cups for supporting said crate.

2. A crate including a plurality of separate sections, and means for securing said sections in assembled relation, said means including a pair of flexible elements adapted to encircle the said sections, means for detachably connecting said elements to the sections, and means carried by one of said elements for rotatably mounting said crate.

3. A revoluble egg crate including a plurality of separate sections, a flexible band for holding said sections in assembled relation, said band consisting of a plurality of freely connected elements, bearing cups carried by certain of said elements and located at the terminals of the crate, a supporting frame, and hanger members carried by the supporting frame and engageable with the bearing cups for revolubly supporting the crate.

4. A revoluble egg crate including a plurality of separate sections, each of said sections including a plate member having a plurality of openings adapted to receive the terminals of eggs, a depending rim formed on the periphery of the plate, a spacing frame mounted on the plate, a retaining plate having a plurality of openings adapted to register with the openings of the body plate, said retaining plate being held in spaced relation to the body plate by the said spacing rim, means for holding the retaining plate and spacing frame in position on the said body plate, and means for holding the sections in assembled relation.

5. An egg crate including a plurality of separate sections, each of said sections including a body plate having a depending rim adapted to bear against the body plate of the next adjacent section for spacing the body plates from each other, a retaining plate, a spacing frame interposed between the retaining plate and body plate, said retaining plate and body plate being each provided with a plurality of openings adapted to receive the egg terminals, flexible means maintaining the body plate, spacing frame and retaining plate in assembled relation to each other, and a flexible means independent of the crate and removable therefrom for holding the sections in assembled relation.

6. An egg crate including a plurality of separate egg receiving sections, means for holding said sections in assembled relation, said means including separate band members adapted to be positioned against the top and bottom sections, end plates adapted to bear against the terminals of the sections, hook members carried by that band member which engages against the bottom section, said hook members being engageable with the lower terminals of the end plates, hook members carried by the upper terminals of the end plates, said last mentioned hooks being engageable with the terminals of that band which bears against the upper section of the crate, and bearing cups carried by the end plates for revolubly supporting the crate.

In testimony whereof I affix my signature in presence of two witnesses.

OLUF OPSJON. [L. S.]

Witnesses:
 FRANK J. LUEDKE,
 WM. N. DUNN.